UNITED STATES PATENT OFFICE.

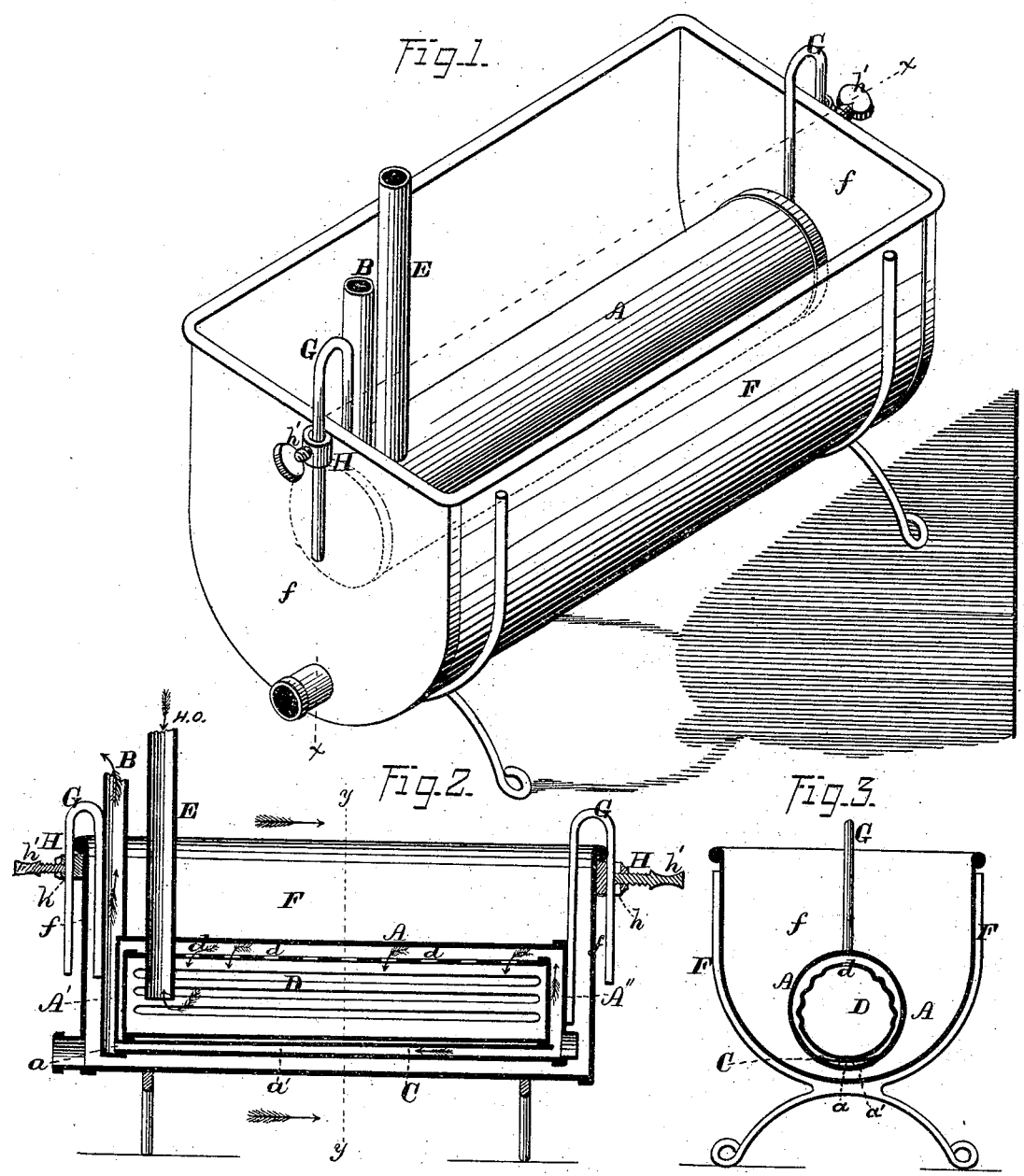

JAMES B. MARQUIS, OF NORWICH, NEW YORK.

IMPROVEMENT IN MILK-COOLERS.

Specification forming part of Letters Patent No. 175,480, dated March 28, 1876; application filed January 29, 1876.

*To all whom it may concern:*

Be it known that I, JAMES B. MARQUIS, of Norwich, in the county of Chenango and in the State of New York, have invented certain new and useful Improvements in Milk-Coolers; and do hereby declare that the following is a full, clear, and exact description thereof, reference being had to the accompanying drawings, making a part of this specification, in which—

Figure 1 is a perspective view of my improved apparatus as applied to a milk-pan. Fig. 2 is a section of the same upon line $x\ x$ of Fig. 1; and Fig. 3 is a vertical cross-section upon line $y\ y$ of Fig. 2.

Letters of like name and kind refer to like parts in each of the figures.

The design of my invention is to enable liquids contained within pans or vats to be brought to and maintained at any given temperature; and it consists principally in the peculiar construction of the water-holder, substantially as and for the purpose hereinafter specified.

It consists, further, in the means employed for connecting the water-holder to or with a pan or vat, and for rendering the same vertically adjustable within the same, substantially as and for the purpose hereinafter shown.

In the annexed drawings, A represents a sheet-metal cylinder, which has any desired dimensions, is inclosed at its ends by means of suitable heads A′ and A″, and at one of said ends is provided with a vertical pipe, B, that, at its lower end, communicates with the interior of said cylinder through an opening, $a$, which is formed in and through the head A′ at its lower edge. From a point just above the opening $a$ a sheet-metal diaphragm, C, extends horizontally across the interior of the cylinder A and from the head A′ lengthwise nearly to the opposite head A″, and forms a passage, $a'$, from said opening along the lower side of said cylinder, through which water, entering from or escaping through the pipe B, would be obliged to pass when leaving or entering said cylinder by such pipe. Within the cylinder A is placed a second smaller cylinder, D, which is inclosed at all points except along its upper side, where are provided a series of perforations, $d$, $d$, and $d$, that extend the whole length of the same. A pipe, E, extends from the end of the cylinder D nearest to the pipe B, upward through the cylinder A, completes the device, which is connected to or with a pan, F, by the following-described means: A rod, G, is secured at one end to or upon each end of the cylinder A, and extending upward to a height greater than the height of the end $f$ of the pan F, curves outward and downward, so as to bring its outer arm outside of the latter. A lug, H, constructed with a vertical opening, $h$, for the passage of said rod, is secured to or upon the end $f$ of said pan, and is provided with a set-screw, $h'$, which passes horizontally inward and bears against said rod. As thus arranged, by loosening the screws $h'\ h'$, the water-holder may be adjusted to any desired height, after which it may be secured in position by turning said screws inward.

The operation of the apparatus is as follows: The water-holder is entirely submerged within the liquid contents of the pan F, and, if it is desired to cool the same, cold water is caused to enter the pipe E, from which it passes into the inner cylinder D. From the latter, through the openings $d$ and $d$, said water passes into the upper portion of the outer cylinder A, from thence outward and downward between the walls of the latter and said inner cylinder, until it reaches the bottom of said cylinder A, along which it flows to the open end of the passage $a'$, and, through the latter and the pipe B, escapes from the apparatus, by which operation the said water is caused to pass over the entire inner surface of the said cylinder A, and to cause the same to have a lower general temperature than would otherwise be practicable. When the cold water leaves the inner cylinder it is projected with considerable force against the upper side of the outer cylinder, and, as said water then has a lower temperature than at any subsequent period, it will be seen that the upper portion of said outer cylinder possesses a lower temperature than its lower side, and, being in contact with the warmest portion of the liquid being cooled, will cause such circulation of the latter within its pan as to soon reduce it to the desired temperature, after which a slight flow of water within the holder will cause such temperature to be maintained and rendered uniform.

For warming the contents of a pan the circulation of the heated water through the holder should be reversed.

While preferably employing my apparatus for regulating the temperature of milk within a pan or vat, it may with equal advantage be used for effecting the same result with reference to the air of refrigerators, dwellings, cars, ships, &c.

Having thus fully set forth the nature and merits of my invention, what I claim as new is—

1. The hereinbefore-described water-holder, consisting of the outer cylinder A, provided with the pipe B and passage $a'$, and the inner cylinder D, having the openings $d$, $d$, and $d$ within its upper side, and the pipe E communicating between its interior and the outer side of said cylinder A, said parts being constructed and combined to operate in the manner and for the purpose substantially as specified.

2. The means employed for combining the cylinder A and pan F, consisting of the rods G and G secured to the ends of the former, and the lugs H, provided with the openings $h$ and set-screws $h'$, and secured to or upon the outer face of the ends of said pan, substantially as shown.

In testimony that I claim the foregoing I have hereunto set my hand this 18th day of January, 1876.

JAMES B. MARQUIS.

Witnesses:
H. G. PRINDLE,
R. B. PRINDLE.